United States Patent [19]

Iino et al.

[11] Patent Number: 4,757,878
[45] Date of Patent: Jul. 19, 1988

[54] METHOD AND SYSTEM FOR LUBRICATION

[75] Inventors: Mitsuaki Iino, Ichihara; Toshio Sakurai; Tadashi Koizumi, both of Yokohama, all of Japan

[73] Assignees: Idemitsu Kosan Company Limited; Ebara Corporation, both of Tokyo, Japan

[21] Appl. No.: 948,183

[22] Filed: Dec. 31, 1986

[30] Foreign Application Priority Data

Jan. 8, 1986 [JP] Japan .................................. 61-1778

[51] Int. Cl.$^4$ ............................................. F01M 11/10
[52] U.S. Cl. ....................................... 184/6.4; 73/64; 184/108
[58] Field of Search ................................ 184/6.4, 108; 123/196 S, 196 AB; 73/64, 151, 153

[56] References Cited

U.S. PATENT DOCUMENTS

| 3,497,034 | 2/1970 | Eddy, Jr. | 184/6.4 X |
| 3,968,677 | 7/1976 | Felton, Jr. | 73/64 X |
| 4,306,525 | 12/1981 | Faxvog | 123/196 S |
| 4,421,078 | 12/1983 | Hurner | 123/196 S |

FOREIGN PATENT DOCUMENTS

| 174601 | 3/1986 | European Pat. Off. | 184/6.4 |
| 2527775 | 12/1983 | France | 184/108 |
| 145412 | 7/1985 | Japan | 184/6.4 |

Primary Examiner—Leonard E. Smith
Attorney, Agent, or Firm—Flynn, Thiel, Boutell & Tanis

[57] ABSTRACT

The present invention relates to a method and a system for lubrication of a mechanical system and the like used under the severe conditions, and includes a lubricating oil feeding device to the mechanical system, a lubricating oil extracting device, a device for analyzing properties of the lubricating oil thus extracted and a device for controlling in accordance with the result of the analysis. As commensurate to the degree of the extracted lubricating oil, new lubricating oil is fed into lubricated portions from the feeding device in response to a command from the controlling device, while, the lubricating oil is extracted from the lubricated portions to renew the lubricating oil.

7 Claims, 1 Drawing Sheet

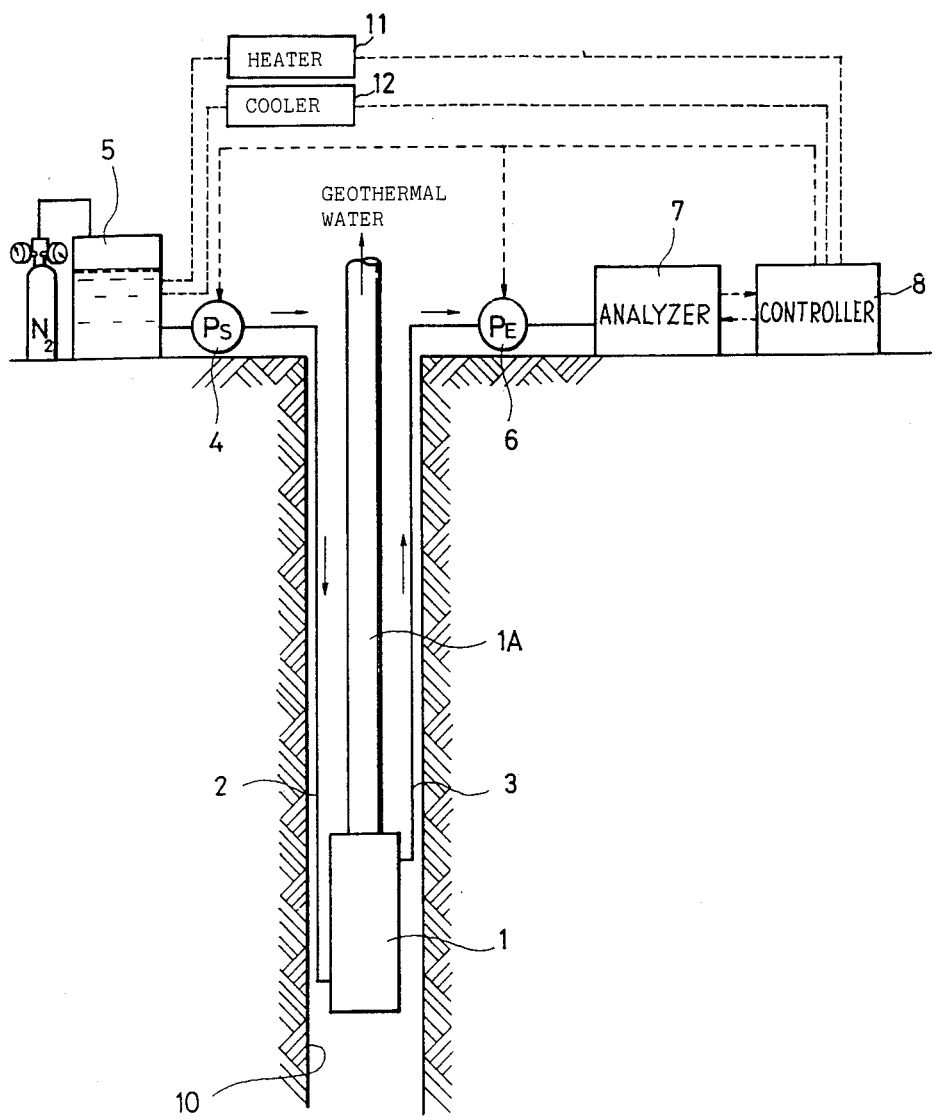

METHOD AND SYSTEM FOR LUBRICATION

BACKGROUND OF THE INVENTION

1. Field of the Invention

This invention relates to a method and a system for lubrication, suitable for lubrication under the adverse conditions, such for example as in a downhole pump and the like used for pumping geothermal water in geothermal power generation.

2. Description of the Prior Art

In general, for lubricating a mechanical system, there has heretofore been adopted a method of sealing off a lubricant. However, particularly, under the severe conditions such as high temperature and high pressure, deterioration of the lubricant is quickened, the performance of the mechanical system is deteriorated, and further, possibilities of occurrences of troubles and damages are increased, so that the reliability is lowered.

In the geothermal power generation which has been popularized in recent years, downhole pumps are used for pumping of high temperature geothermal water. However, when the geothermal water temperature is 200° C. at 400 m underground for example, the temperature of fill oil in the downhole pump reaches 260°–300° C. due to the heating of a motor or the like, so that the pressure applied to the pump reaches 30–50Kg/cm². Under the above-described conditions, there is no lubricating oil or insulating oil, which has a service life more than several thousand hours, and, even jet engine oil, which is optimal as a substitute, has a service life of only scores of hours.

As the countermeasure for avoiding the abovedescribed disadvantages, there has been increased the frequency of stopping the mechanical system in operation to change the lubricant, which is resupplied, thus lowering the operating efficiency.

Now, in order to avoid the lowered performance of the mechanical system, there have been practiced the change of lubricant before the lubricant is deteriorated and reaches its service life and the delayed change of a lubricant having a long service life to decrease the frequency of changes of the lubricants. However, when the lubricant is sealed off, or at a portion beyond approach by an operator, inspection cannot be carried out, and further, it is difficult to previously learn the service life varied depending on the use conditions. As a consequence, the change of the lubricant is made rather earlier than the expected service life to avoid occurrence of an obstruction due to the use of the deteriorated lubricants. In this case, there have been such disadvantages, that a lubricant having a long service life is expensive, an impossibility of using up the service life of the lubricant contributes to an increased expense, thus lowering the economics, and moreover, the frequent changing operations lower the operating efficiency and the maintenance.

SUMMARY OF THE INVENTION

The present invention has as its object the provision of a method and a system for lubrication to considerably improve the economics, reliability and maintenance in lubrication for a mechanical system used under the adverse conditions.

According to the method of lubrication of the present invention, a lubricant is fed and resupplied in lubricated portions of a mechanical system, part of the lubricant is extracted to renew the lubricant therein, further, the extracted lubricant is inspected, and predetermined control is made as commensurate to the degree of deterioration of the lubricant.

Furthermore, the system for lubrication according to the present invention includes: means for feeding the lubricant to the lubricated portions of the mechanical system; means for extracting the lubricant in the interior from this feeding means; means for analyzing properties of the lubricant thus extracted; and a device for controlling the feeding means and the extracting means in accordance with the result of the analysis made by this analyzing means.

According to the present invention, the lubricant is constantly maintained in the effective conditions, even in the use under the adverse conditions, satisfactory performance of lubrication is maintained, the lubricant can be effectively used up immediately before the end of the service life to instantly detect the advanced stage of deterioration, and, even an inexpensive lubricant having a short service life can be used without a trouble, so that the economics is improved. Moreover, no periodical changing operation is needed, and all of the above-described regulations can be automated, so that the maintenance is improved, and further, and early finding of an abnormality in the interior of the mechanical system can be made at the time of the aforesaid inspection, thus improving the reliability.

BRIEF DESCRIPTION OF THE DRAWING

The drawing is a schematic view showing the arrangement of one embodiment of the system, to which is applied the lubricating method according to the present invention.

DETAILED DESCRIPTION OF THE PREFERRED EMBODIMENT

One embodiment, wherein the present invention is applied to a submergible type downhole pump for pumping high temperature geothermal water, will hereunder be described, with reference to the drawing.

In a hole 10 drilled for pumping geothermal water e.g. at a position 400 m underground, there is provided a submergible type downhole pump 1 for pumping the geothermal water. This downhole pump 1 is connected at the bottom portion thereof to an oil feeding pipe 2 and at the top portion thereof to an extracting pipe 3, respectively. Both of these pipes 2 and 3 are formed of a heat-resistant and corrosion-resistant material, e.g. steel, have diameters of about 5–20 mm, and are extended to the surface of the ground along a water feeding pipe 1A of the downhole pump 1. The oil feeding pipe 2 is connected to an oil feeding tank 5 through an oil pump 4. This oil feeding tank 5 is provided thereon with a heater 11 and a cooler 12 and sealed off by nitrogen. On the other hand, the extracting pipe 3 is connected to a waste oil disposal device, not shown, through an analyzer 7 and by way of an extraction pump 6. As for this analyzer 7, various types are used depending on the properties of the lubricants being used. A component or a plurality of components are used which can specifically measure necessary values including infrared absorption spectrum, gas chromatography, high speed liquid chromatography, ultra-violet and visible spectra, viscosity, specific gravity and so forth.

The analyser 7 is connected to a controller 8 through a circuit, and the controller 8 has control circuits to the oil pump 4, the extracting pump 6, the heater 11 and the cooler 12. As for this controller 8, a microcomputer or the like is used and adapted to perform control of the analyzer 7, holding and comparing of analyzed data and operational controls of the respective pumps 4, 6, and the heater 11 and cooler and 12.

With the above-described arrangement, lubricating oil as being the lubricant stored in the oil feeding tank 5 and held in the optimal conditions by the heater or the cooler is continuously or intermittently pumped up by the oil feeding pump 4, delivered under pressure, passed through the oil feeding pipe 2 and resupplied lubricated portions in the downhole pump 1, where the lubrication is performed. On the other hand, the lubricating oil in the downhole pump 1 is passed through the extracting pipe 3, continuously or intermittently extracted by the extraction pump 6, delivered to the analyzer 7, where the degree of deterioration is inspected through predetermined analyses such as absorption intensity of $C=O$ in infrared ray spectrum, absorption intensity of $H_2O$ or a quantity of a lighter-gravity portion in gas chromatography, and thereafter, the lubricating oil is put to disposal as waste oil.

The results of the inspections of the degree of deterioration in the analyzer 7 is recorded in the controller 8, where comparisons with the preset reference values of the inspections are carried out, and, in accordance with the results of comparisons, discharge pressures of the oil feeding pump 4 and the extraction pump 6 are controlled. For example, when it is judged that the degree of deterioration is high, the quantity of lubricating oil to be fed and discharged are increased, and renewal of the lubricating oil in the lubricated portions in the downhole pump 1 is facilitated to hold the lubricating oil in the effective conditions. Furthermore, the discharge pressure of the oil feeding pump 4 and a difference in discharge pressure between the oil feeding pump 4 and the extraction pump 6 are regulated to control the pressure in the downhole pump 1, and the geothermal water is prevented from mixing into the pump through sealed portions. In this case, when the mixing of the geothermal water and the like is detected in the analyzer 7, indication of an abnormality is performed by issuance of a warning or the like.

As described above, according to this embodiment, the lubricating oil in the lubricated portions of the downhole pump 1 is continuously or intermittently renewed, so that deterioration of the lubricating oil, and further, troubles and damages occurring due to the operations by use of deteriorated lubricating oil can be previously prevented, to thereby improve the reliability. Further, pump pull-up operations and stops of the pump in operation due to the change of the lubricating oil, which have been unavoidable with the conventional sealed-type pumps, can be dispensed with, so that the operating efficiency and the maintenance can be improved to a considerable extent. Furthermore, in the renewal of the lubricating oil, such an automation is made that the quantity of lubricating oil to the renewed is controlled in accordance with the result of analyzing of the extracted lubricating oil, and further, such an abnormality as mixing foreign matters including the geothermal water and the like into the lubricated portions of the downhole pump 1 can be found in advance, so that the operation can be stopped and appropriate cautions can be taken before the troubles or damages occur in the downhole pump 1. Additionally, in this embodiment, the difference in discharge pressure between the oil feeding pump 4 and the extraction pump 6 can be regulated to control the oil pressure in the lubricated portions of the downhole pump 1, so that a pressure equalizer such as bellows can be dispensed with and the geothermal water can be effectively prevented from intruding through the sealed portions of the downhole pump 1. Further, the state of deterioration of the used lubricating oil can be learn and the renewal of the lubricating oil can be carried out performed as commensurate to the degree of deterioration thereof, so that mineral oil, silicone oil and other types of oil being relatively inexpensive and short in service life can be used without any problem, thus effectively reducing the running costs. Additionally, this embodiment is not of a so-called circulation type and the feed of the lubricating oil is strictly the resupply, so that the quantity of the lubricating oil fed to the lubricated portions may not be large.

In this embodiment, as specific examples of a quantity of feed oil and a quantity of sampling for analysis, when lubricating oil of 200° C. and of a viscosity of $0.0417 Kg.s/cm^2$ is used, according to the formula of Hagen-Poiseuille law, 51 $cm^3$ by a diameter of 5 mm, 203 $cm^3$ by a diameter of 10 mm, and 814 $cm^3$ by a diameter of 20 mm per day, respectively.

Additionally, in the above embodiment, one oil feeding pipe 2 and one extracting pipe 3 are used, however, when more lubrication oil is needed, two or more of the respective pipes can be used. In short, two systems including an oil feeding system and an extraction system should be provided, so that the number of pipes in the practice need not necessarily be limited. Furthermore, application of the present invention need not necessarily be limited to the downhole pump 1, on the contrary, the present invention is applicable to a mechanical system requiring various types of lubrication, and particularly to a method of lubrication of the mechanical systems placed under the adverse conditions.

As has been described hereinabove, the present invention is advantageous in that the economics, reliability and maintenance can be improved to a considerable extent in the lubrication of the mechanical system used under the adverse conditions.

What is claimed is:

1. A method of lubrication, wherein a lubricant is fed into lubricated portions of a mechanical system from outside of said lubricated portions to resupply same, the lubricant in said lubricated portions is extracted to renew the lubricant therein, and the lubricant thus extracted is inspected to control a feeding quantity of the lubricant as commensurate to the degree of deterioration of the lubricant in the mechanical system, wherein said extracted lubricant is compared with a reference value predetermined in accordance with properties of said lubricant, and a feeding quantity is regulated in accordance with the result of the comparison, wherein feed of said lubricant is at least one of continuously performed and intermittently performed, and wherein feeding pressure and discharge pressure at the time of extraction of said lubricant are regulated to maintain pressure in the lubricated portions at a constant value.

2. A system suitable for maintaining a lubricant in lubricated portions of a mechanical system at a constant value, comprising:

lubricant feeding means for feeding the lubricant to said lubricated portions, said lubricant feeding means including an oil feeding tank which is sealed off by nitrogen and provided with a heater and a cooler, which are selectively operated;

means for extracting the lubricant in said lubricated portions from said lubricated portions;

a device for analyzing properties of the lubricant extracted by said extracting means; and a controlling device for controlling said feeding means and said extracting means in accordance with the result of analysis by said analyzing device, said controlling device controlling said feeding means and said extracting means to maintain pressure in said lubricated portions at a constant value, said controlling device being connected to said oil feeding means and said extracting means, respectively, and a feeding quantity of the lubricant from said feeding means and a quantity of the lubricant extracted by said extracting means are controlled in accordance with the result in said analyzing device.

3. A method of lubrication, wherein a lubricant is fed into lubricated portions of a mechanical system from outside of said lubricated portions to resupply same, the lubricant in said lubricated portions is extracted to renew the lubricant therein, and the lubricant thus extracted is inspected to control a feeding quantity of the lubricant as commensurate to the degree of deterioration of the lubricant in the mechanical system, and wherein feeding pressure and discharge pressure at the time of extraction of said lubricant are regulated to maintain pressure in the lubricated portions at a constant value.

4. A method of lubrication as set forth in claim 1, wherein feeding pressure and discharge pressure at the time of extraction of said lubricant are regulated to maintain pressure in the lubricated portions at a constant value.

5. A method of lubrication as set forth in claim 1, wherein, when the result of inspection of said extracted lubricant indicates an abnormal value, a warning is issued.

6. A system suitable for maintaining a lubricant in lubricated portions of a mechanical system at a constant value comprising:

means for feeding the lubricant to said lubricated portions;

means for extracting the lubricant in said lubricated portions from said lubricated portions;

a device for analyzing properties of the lubricant extracted by said extracting means; and a controlling device for controlling said feeding means and said extracting means in accordance with the result of analysis by said analyzing device, said controlling device controlling said feeding means and said extracting means to maintain pressure in said lubricated portions at a constant value.

7. The system as set forth in claim 6, wherein said controlling device controls said feeding means and said extracting means to maintain pressure in said lubricated portions at a constant value.

* * * * *

UNITED STATES PATENT AND TRADEMARK OFFICE
CERTIFICATE OF CORRECTION

PATENT NO. : 4 757 878
DATED : July 19, 1988
INVENTOR(S) : Mitsuaki IINO et al.

It is certified that error appears in the above-identified patent and that said Letters Patent is hereby corrected as shown below:

Col. 6, lines 3-7; delete Claim 4 in its entirety

Col. 6, line 8 ; Change "Claim 1" to ---Claim 3---.

Col. 6, lines 27-30; delete Claim 7 in its entirety.

Signed and Sealed this

Eighteenth Day of April, 1989

Attest:

DONALD J. QUIGG

*Attesting Officer*  *Commissioner of Patents and Trademarks*